(12) United States Patent
Morgan et al.

(10) Patent No.: US 9,367,834 B2
(45) Date of Patent: Jun. 14, 2016

(54) SYSTEMS, METHODS, AND COMPUTER PRODUCTS FOR PROCESSING PAYMENTS USING A PROXY CARD

(75) Inventors: Robert E. Morgan, Glendale, AZ (US); Hitesh Seth, East Windsor, NJ (US)

(73) Assignee: III Holdings 1, LLC, Wilmington, DE (US)

( * ) Notice: Subject to any disclaimer, the term of this patent is extended or adjusted under 35 U.S.C. 154(b) by 962 days.

(21) Appl. No.: 12/692,144

(22) Filed: Jan. 22, 2010

(65) Prior Publication Data

US 2011/0180598 A1    Jul. 28, 2011

(51) Int. Cl.
| | |
|---|---|
| *G06K 5/00* | (2006.01) |
| *G06Q 20/04* | (2012.01) |
| *G06Q 20/02* | (2012.01) |
| *G06Q 20/20* | (2012.01) |
| *G06Q 20/32* | (2012.01) |
| *G06Q 20/34* | (2012.01) |
| *G06Q 20/38* | (2012.01) |
| *G06Q 20/40* | (2012.01) |
| *G06Q 20/42* | (2012.01) |
| *G07F 7/10* | (2006.01) |

(52) U.S. Cl.
CPC .............. *G06Q 20/04* (2013.01); *G06Q 20/02* (2013.01); *G06Q 20/20* (2013.01); *G06Q 20/32* (2013.01); *G06Q 20/3255* (2013.01); *G06Q 20/351* (2013.01); *G06Q 20/3572* (2013.01); *G06Q 20/385* (2013.01); *G06Q 20/405* (2013.01); *G06Q 20/425* (2013.01); *G07F 7/10* (2013.01)

(58) Field of Classification Search
CPC ....... G06Q 20/10; G06Q 20/08; G06Q 20/16; G06Q 20/105
USPC ......................... 235/380, 382; 705/35, 39, 41
See application file for complete search history.

(56) References Cited

U.S. PATENT DOCUMENTS

| | | | | |
|---|---|---|---|---|
| 2002/0062249 | A1* | 5/2002 | Iannacci | 705/14 |
| 2004/0049452 | A1* | 3/2004 | Blagg | 705/39 |
| 2006/0249570 | A1* | 11/2006 | Seifert et al. | 235/380 |
| 2007/0131759 | A1* | 6/2007 | Cox et al. | 235/380 |
| 2007/0262136 | A1* | 11/2007 | Ou | 235/380 |
| 2008/0015988 | A1* | 1/2008 | Brown et al. | 705/44 |
| 2008/0078831 | A1* | 4/2008 | Johnson | G06Q 20/10 235/380 |
| 2009/0043702 | A1* | 2/2009 | Bennett | 705/41 |
| 2010/0076877 | A1* | 3/2010 | Lenahan et al. | 705/32 |
| 2010/0121767 | A1* | 5/2010 | Coulter et al. | 705/67 |
| 2010/0274687 | A1* | 10/2010 | Ghosh et al. | 705/30 |
| 2010/0299218 | A1* | 11/2010 | Aarni et al. | 705/26 |

\* cited by examiner

*Primary Examiner* — Laura Gudorf
(74) *Attorney, Agent, or Firm* — Meyertons, Hood, Kivlin, Kowert & Goetzel, P.C.

(57) ABSTRACT

Systems, methods and computer program products for processing payments for a proxy card are provided. Embodiments of the system include a processor, and a memory in communication with the processor. The memory may be configured to store processing instructions for directing the processor to receive a request for authorization of a payment. In various embodiments, the request is triggered at a merchant server, by the use of a proxy card of the customer. The processor attempts to identify at least one desired payment mode for making the payment, from among payment mode(s) associated with the proxy card. The processor first selects the payment modes based at least in part on one or more selection criteria, such as predefined customer goals, and then the processor performs an authorization check to identify the desired payment modes. Subsequently, the processor authorizes the payment if at least one desired payment mode is identified.

20 Claims, 8 Drawing Sheets

| Type of Purchase | Payment Mode Preferences | Re-selection Preferences |
|---|---|---|
| Gas related Purchase | Loyalty Gas card | Communicate the available payment mode option to the user |
| Transactions worth between $10 - $500 | Redemption coupons | Select Payment Mode "A" |
| Transactions worth above $5000 | Split the amount between Payment Mode "A" and "B" | Select Payment Mode "C" |
| For any purchase | In case pre-paid gift coupons are available, exhaust the amount of the pre-paid coupons | Select Payment Mode "D" |

Table 402

FIG. 4

| Payment mode options | Associated updates |
|---|---|
| Payment Mode "A" | Earn double rewards points for each transaction of $100 |
| Payment Mode "B" | Get discount coupons worth 10% of transaction amount for selected merchandise outlets |
| Payment Mode "C" | Suggested payment mode based on the past behavior of majority of other customers for goods / services purchased in a restaurant. |
| Payment Mode "D" | No present benefits are associated with this payment mode at present |

Table 502

SYSTEMS, METHODS, AND COMPUTER PRODUCTS FOR PROCESSING PAYMENTS USING A PROXY CARD

BACKGROUND OF THE INVENTION

1. Field of the Invention

The present invention generally relates to processing payments, and more particularly, to methods, systems, and computer program products for processing payments using proxy cards.

2. Related Art

Payment modes, such as credit cards, debit cards, bank accounts, pre-paid gift cards, health savings accounts, loyalty rewards accounts, redemption coupons, and the like are used for conducting transactions. Consumers often carry two or more cards or a combination of cards and a payment device such as a fob.

For a variety of reasons, different cards may be used depending on the type of transaction. For example, a merchant may not accept a particular payment mode. Or, the consumer may wish to use various payment modes to take advantage of the unique benefits associated with each. A loyalty gas card may offer a good deal or generous points for gas purchases. A flight card may provide benefits in the form of accumulating air miles. As a result, a consumer may carry one or more credit cards for common use and one or more store-specific or brand-specific transaction cards for use in specific transactions where they provide more attractive offers/discounts.

Managing, as well as simply carrying, a large number of payment modes can be cumbersome. Discounts and offers and their associated several payment modes need to be tracked and several receipts may need to be signed.

Moreover, the more payment modes a consumer carries, the higher the risk of losing one of them. A lost card or fob might not be detected immediately, giving time to someone else to misuse the card before it is reported missing.

On the other hand, a consumer who conserves wallet space by carrying fewer payment modes often finds that on various occasions the most desirable payment mode for effecting a particular transaction is not available when needed. In addition, it may be the case that a merchant does not accept the payment mode most commonly used by the consumer.

It would be useful to process transactions using a single card, device or a single account number which enables the use of one or more payment modes available to the consumer, with no changes required in the existing point of sale (POS) infrastructure.

SUMMARY OF THE INVENTION

The present invention meets the above-mentioned needs by providing methods, systems and computer program products for processing payments for a proxy card of a customer.

According to one embodiment of the present invention, there is disclosed a method for processing a payment for a proxy card. The method includes receiving a request for authorization of the payment at a server. In various embodiments, the authorization request is triggered at a merchant server by the use of a proxy card of the customer. The method involves attempting to identify a desired payment mode for making the payment, from among one or more payment modes associated with the proxy card, in response to the authorization request received from the merchant server. The payment modes are first selected based at least in part on one or more selection criteria and then an authorization check is performed to identify the desired payment mode. Subsequently, the payment is authorized if at least one desired payment mode is successfully identified.

According to yet a further embodiment of the present invention, there is disclosed a system for processing a payment for a proxy card. Various embodiments of the system include at least one processor, and a memory in communication with the at least one processor. The memory may be configured to store a plurality of processing instructions for directing the at least one processor to receive a request for authorization of the payment. In various embodiments, the authorization request is triggered at a merchant server by the use of a proxy card of the customer. The processor further attempts to identify at least one desired payment mode for making the payment, from among one or more payment modes associated with the proxy card of the customer. The processor first selects the payment modes based at least in part on one or more selection criteria and then the processor performs an authorization check to identify the desired payment modes. Subsequently, the processor authorizes the payment if at least one desired payment mode is identified.

According to another embodiment of the present invention there is provided a computer program product for processing a payment for a proxy card. The computer program product includes a computer usable medium having control logic stored therein for causing a computer to process the payment for the proxy card. The control logic includes a first, second, third, fourth and a fifth computer readable program code. The first computer readable program code causes the computer to receive a request for authorization of a payment. In various embodiments, the authorization request is triggered at a merchant server by the use of a proxy card of the customer. The second computer readable program code causes the computer to attempt to identify at least one desired payment mode options for making the payment, from among one or more payment modes associated with the proxy card. The computer readable program code first selects the payment modes based at least in part on one or more selection criteria and then performs an authorization check to identify the desired payment modes. The third computer readable program code causes the computer to authorize the payment if at least one desired payment mode is identified.

Various embodiments of the present invention provide systems, methods, and computer program products for processing a payment for a proxy card. The various embodiments may also include performing one or more of the aforementioned functions independently and in any order, as per the need.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the following drawings.

DETAILED DESCRIPTION OF THE INVENTION

I. Overview

The present invention is now described in more detail herein in terms of an exemplary financial transaction network. This is for convenience only and is not intended to limit the application of the present invention. In fact, after reading the following description, it will be apparent to one skilled in the relevant art(s) how to implement the following invention in alternative embodiments (e.g., flexible spending account processing networks such as health savings account networks, loyalty reward networks, electronic coupon processing networks, and the like.).

The terms "user," "end user," "consumer," "customer," "participant," and/or the plural form of these terms are used interchangeably throughout herein to refer to those persons or entities capable of accessing, using, being affected by and/or benefiting from the example embodiments described herein.

The terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

"Financial transaction" means an event between a buyer and a seller, where the buyer acquires an asset, which could be a physical asset or an electronic asset, from the seller in exchange for payment.

The terms "transaction" and "purchases" may be used interchangeably and shall refer to any financial transaction initiated by the customer at a point of purchase, which could be a physical POS terminal or a non-physical POS terminal such as an Internet webpage.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A "financial transaction" instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or may be a fob having a transponder and an RFID reader. For example, a financial transaction instrument could take the form of a wristwatch, a wristband, or the like.

"Open cards" are financial transaction cards that are generally accepted at different merchants. Examples of open cards include the American Express®, Visa®, MasterCard® and Discover cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

"Stored value cards" are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments up to ten dollars.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., a rewards, charge, credit, debit, pre-paid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

N1N2N3N4    N5N6N7N8    N9N10N11N12 N13N14N15N16

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

It should be noted that the transfer of information in accordance with the present invention, may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portion of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e. name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe format. For example, the counter values, authentication tags and encrypted identifiers, described herein, may be forwarded encoded in all or a portion of a data stream representing data encoded in, for example, track 2 or track 3 format.

"Proxy instrument" or "proxy card" may be used interchangeably with each other and shall mean a financial transaction instrument that can be used to represent multiple payment modes. For example, a proxy instrument can be a typical transaction card such as a credit card, debit card, stored-value card and the like, which when used to make a transaction (e.g., a purchase), triggers a procedure which processes the payment using one of several accounts. Such a card can also be used to cause a combination of available transaction accounts to be displayed on a user interface, such as a mobile presentation device or on a POS. Such a representation is often referred to as a "virtual wallet." The virtual wallet receives, from a server, data indicating the available transaction accounts and payment options linked to the proxy card. In turn, the customer can access the virtual wallet and choose one or more payment options based on individual preference.

In another embodiment, a customer who is not in physical possession of a proxy card enters a number or alpha-numeric code associated with the proxy card into the POS. The POS then displays the account and payment choices to the customer, from which the customer can choose to complete a transaction. In this way, the customer need not have the physical proxy card in their possession to complete the transaction.

A "proxy account" is an account that can be used to represent of multiple actual accounts.

An "out-of-band communication" is any form of communication that is not with a point of sale interaction. An out-of-band communication may be in the form of a telephone or network communication to the card issuer or processor. Examples of out-of-band notification include, but may not be limited to notification through an SMS message, a voice call back, or an email.

As will be explained in more detail below, users can store predefined preferences as to which payment mode(s) to use to pay for a transaction. For example, a customer may set preferences to split the amount of a transaction between multiple payment modes. The customer may choose to pay part of the transaction amount using a pre-paid gift card and pay the rest of the amount through a credit card.

A proxy-card payment gateway uses an out-of-band communication to receive customer authentication information and a selection as to which payment mode(s) to use to make the payment. Additional authentication levels may be required based on individual preferences. For instance, to authenticate a payment request, a customer may contact an automated call center and enter a Card Identification Number (CID), such as Personal Identification Number (PIN) for a debit card, or enter a preregistered bank account number if the customer chooses to pay through a bank account.

Because multiple payment modes may be used, multiple authentications may be required at different stages of the transaction or based on the security requirements associated with each transaction account. Alternatively, one authentication may be used to cause other prestored authentication passwords to be transmitted to their respective payment processing systems.

II. System

Figure 1:
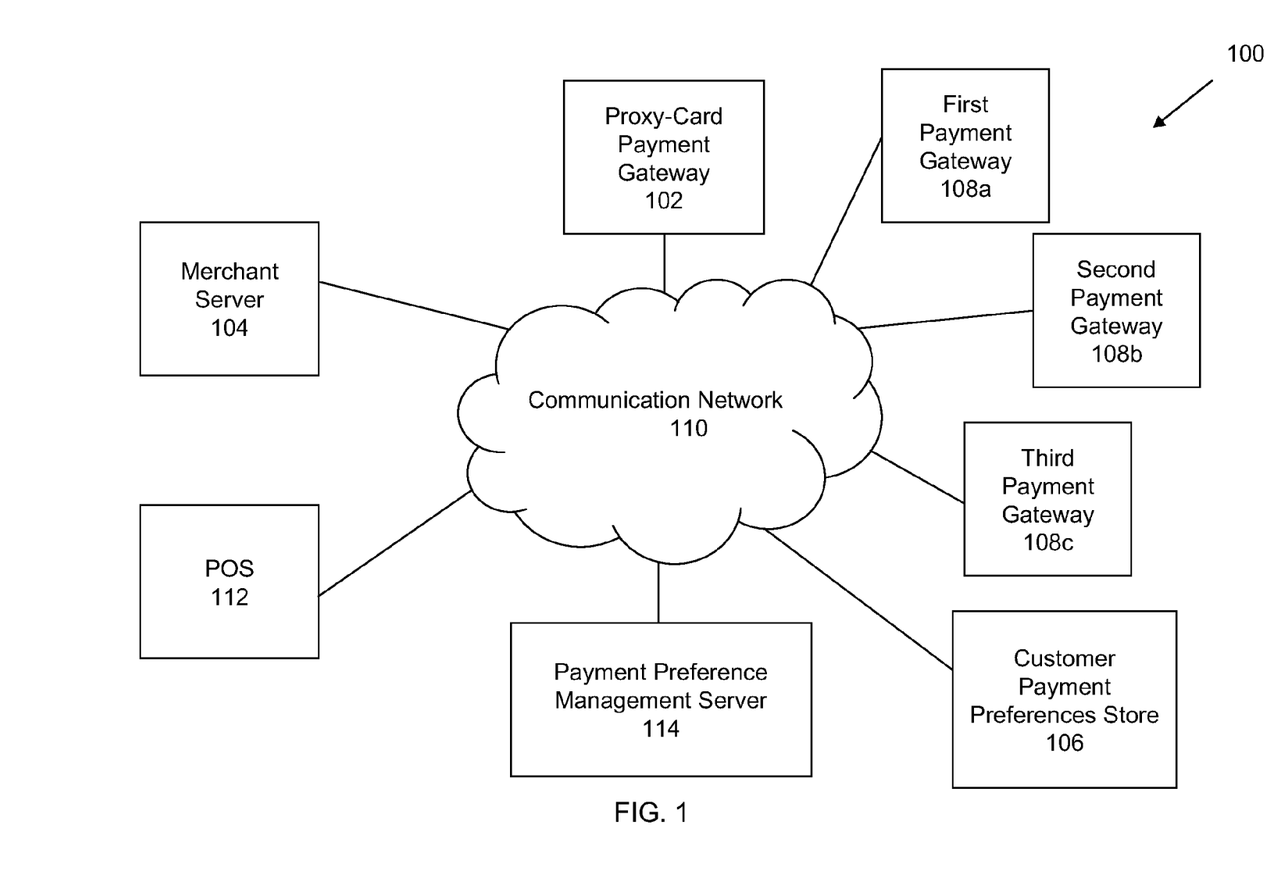
FIG. 1 depicts a payment processing network for processing payments using proxy cards in accordance with an embodiment of the present invention.

FIG. 1 depicts a payment processing network 100 for processing payments using proxy cards in accordance with an embodiment of the present invention. Payment processing network 100 includes a communications network 110 that connects sellers, buyers, processors and/or acquiring banks that process and settle transactions. Communication network 110 may be a wide area network (WAN), a local area network (LAN), an Ethernet, Internet, an Intranet, a cellular network, a satellite network, a near field communication (NFC) network, a BLUETOOTH network, a WI-FI network, or any other suitable network for transmitting data. In various embodiments, communication network 110 may include a combination of two or more of the aforementioned networks and/or other types of wired and/or wireless networks known in the art.

Payment processing network 100 includes a proxy-card payment gateway 102 that serves to provide a network in which information is transferred among merchants, customers and financial networks, such as payment processors or acquiring banks, to process authorizations and payments in connection with transactions.

A proxy number or account identifier acts as a trigger to open a virtual payment wallet stored at the proxy-card payment gateway 102.

A merchant server 104, also sometimes known as a "commerce server," is a server on the communications network 110 constructed to handle transactions such as online purchases and credit card transactions. Merchant server 104 may also provide an online storefront and shopping cart infrastructure.

A customer payment preferences store 106 stores pre-defined customer preferences as to which payment mode(s) to use for a transaction. One or more payment gateways such as a first payment gateway 108a, a second payment gateway 108b, a third payment gateway 108c, a point of sale (POS) 112, a payment preference management server 114, and a customer payment preferences store 106, communicate through communication network 110. POS 112 refers to a terminal or, more generally, to the hardware and software for reading financial transaction instruments used for payment of purchased goods and/or services.

A customer initiates a transaction through POS 112 at a merchant location, and generates an authorization request. For example, a transaction can be initiated by swiping a financial transactional card of the customer at the POS 112. POS 112, in turn, generates the authorization request and transmits it over a network to the proxy-card payment gateway 102 via the merchant server 104.

Proxy-card payment gateway 102 determines whether the authorization request is associated with a proxy-card. If so, the proxy-card payment gateway 102 opens a virtual payment wallet associated with the proxy-card and determines the available payment mode options associated with the corresponding proxy account.

Payment preference management server 114 receives input from the customer and stores the customer's preferences in a memory or like storage device. In one example aspect, the preferences identify which payment mode option(s) to use, based in part, on the nature of the authorization request. The term "preferences" refers to any rules and/or settings associated with the payment modes, and configured by the customer. In an example embodiment, the payment preference management server 114 is a Web server which allows dynamic configuration of the preferences by the customer. The payment preference management server 114 also can communicate preferences to the customer payment preferences store 106, which is in communication with the proxy-card payment gateway 102 via a communication network 110. The customer may use various existing interaction channels such as the Internet, mobile, etc., to access the payment preference management server 114.

Figure 2:
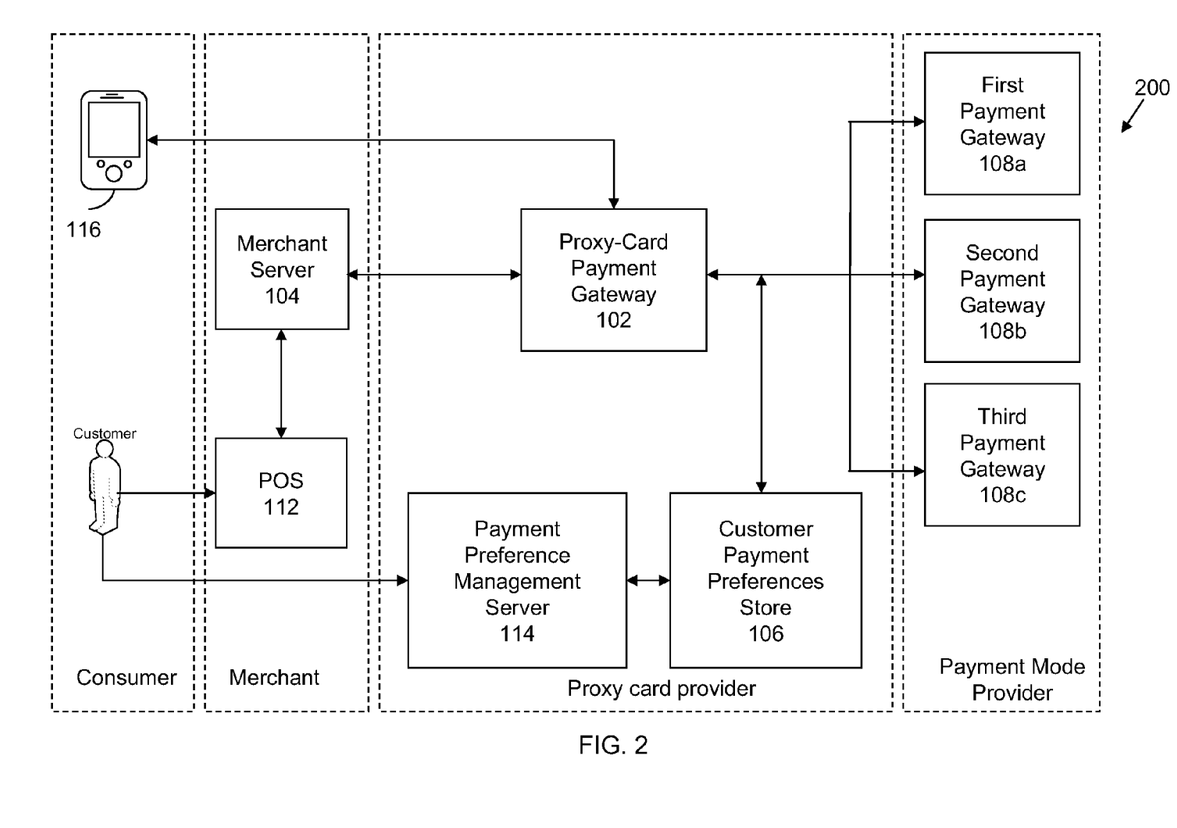
FIG. 2 is a schematic system diagram of an exemplary system used to implement or practice one or more embodiments of the present invention.

FIG. 2 is a schematic system diagram of an exemplary system 200 used to implement or practice one or more embodiments of the present invention. As shown in the FIG. 2, the customer may swipe a financial transaction card at the POS 112 to initiate a transaction. Subsequently, POS 112 triggers the merchant server 104 via the communication network 110 to send an authorization request to the proxy-card payment gateway 102. The proxy-card payment gateway 102 determines whether the authorization request is received from the proxy card of the customer. Since, the request is received from the proxy card, the proxy-card payment gateway 102 opens a virtual payment wallet stored at the proxy-card payment gateway 102. The virtual payment wallet stores information related to one or more payment modes such as, but not limited to, a debit card account, credit card account, bank account, pre-paid gift card, free savings account, flexible spending account, health savings account, reward points, redemption coupons, and the like, etc., in a secure environment.

Subsequently, the proxy-card payment gateway 102 attempts to identify at least one desired payment mode to use to make the payment from among the payment modes associated with the proxy card of the customer. This decision is based on one or more preferred selection criteria. The selection criteria may include, but are not limited to, selecting a payment mode based on the pre-defined preferences of customer and/or communicating one or more payment mode options to the customer in order to receive a selected payment mode as per the customer preference. For example, the proxy-card payment gateway 102 queries the customer payment preferences store 106 to identify if the customer has configured any pre-defined preferences. For instance, the customer can add a pre-defined preference to the customer payment preferences store 106 defining a desired goal the customer wishes to attain. The goal may include, for example, a number of desired reward points, a total amount of transactions per month required to receive a discount, etc. In another embodiment, if no pre-defined customer preferences are associated with the authorization request, then the proxy-card payment gateway 102 may communicate payment mode options to the customer and request the customer to select a payment mode from the option. The proxy-card payment gateway 102 may communicate the payment mode options to the customer by sending an out-of-band notification to the customer. As described above, an out-of-band notification can be any notification which is transmitted through a communication channel other than the normal channel associated with an authorized request. In the example implementation shown in FIG. 2, the out-of-band notification is sent to a mobile phone 116 of the customer.

In addition to communicating the payment mode options to the customer, the proxy-card payment gateway 102 may further recommend a preferred payment mode to the customer based on, for example, past behavior of the customer and/or a majority of other customers that initiate similar authorization requests. Past behavior may include transactions made by the customer or other customers by one or more payment modes in the past, and recorded in the one or more databases (not shown) of the proxy-card payment gateway 102. However, in an embodiment of the present invention, the customer may not prefer that the selected payment mode be recorded as an indication of the past behavior. In addition to suggesting payment options to the customers, the proxy-card payment gateway 102 may also offer the customer an option to pre-define the suggested payment modes for all future transactions similar to the current authorization request.

In another embodiment, the proxy-card payment gateway 102 recommends a payment mode to a first customer by performing collaborative filtering of payment preferences stored in the customer payment preferences store 106. In particular, the proxy-card payment gateway 102 filters payment preferences within the customer payment preferences store 106 to identify similar customers, that is, customers having defined payment preferences similar to payment preferences defined by the first customer. The proxy-card payment gateway 102 then recommends a payment mode to the first customer according to payment preferences defined by the similar customers. In this way, the first customer can benefit from an ongoing promotion associated with a particular payment mode, without the need to maintain continuous awareness of the ongoing promotion. Rather, the first customer can take advantage of the ongoing promotion by relying on the payment preferences of similar customers.

The proxy-card payment gateway 102 also may be in communication with one or more external servers or databases (not shown) that gather or provide dynamically updated information on the available payment mode options. For example, information on a payment mode option may include changes in the credit limit of a payment mode (e.g. credit card), new offers, product specific discounts provided that a particular payment mode be used, and the like. This information may be subsequently transmitted for processing and analysis to the proxy-card payment gateway 102 over the communication network 110, and may be transmitted in an encrypted or otherwise secure format, in a wide variety of known manners. These suggestions are communicated to the customer by proxy-card payment gateway 102 when, for example, dynamic updates are received for the one or more payment mode options.

Referring again to the example scenario of FIG. 1, once the proxy-card payment gateway 102 selects at least one payment mode, it transmits corresponding authorization requests to their respective payment gateways 108a-c. In turn, the payment gateways 108a-c, which have issued the selected payment modes, perform their respective authorization checks.

In an embodiment of the present invention, the proxy-card payment gateway 102 may be operated by a proxy card provider, which has issued one or more of the selected payment modes. Thus, the proxy-card payment gateway 102 and/or other payment gateways 108a-c may perform corresponding authorization checks on the selected cards.

The authorization process can be used to identify at least one desired payment mode for making the payment based at least in part on one or more authorization criteria, which may include, but not limited to, checking available credit limit of the payment mode for making the payment, expiry date of the payment mode, validity of the payment mode, other customer preferences associated with the payment mode and so on. If the selected payment mode is authorized, then the proxy-card payment gateway 102 authorizes the payment from the selected payment mode. However, if the selected payment modes is not authorized, then the proxy-card payment gateway 102 may select at least one alternative payment mode. The proxy-card payment gateway 102 selects the alternative payment modes based on the selection criteria, which may include checking if pre-defined preferences define a re-selection criteria, communicating the rest of the payment mode options to the customer, or by checking a past behavior of the customer or other customers for similar authorization requests. A detailed explanation of an exemplary re-selection criteria is discussed below with reference to FIG. 4.

In one embodiment, a payment mode for a financial transaction is changed after the transaction has been authorized. A customer initially authorizes a transaction using a first payment mode, but then decides to use a second payment mode to obtain preferred advantages, such as reward points. The customer transmits an out-of-band communication to the proxy-card payment gateway 102 to select the second payment mode to be used for the transaction instead of the first payment mode. Alternatively, the second payment mode can be suggested by the payment preference management server 114 instead of being requested by the customer. In this case, an out-of-band communication suggesting the second payment mode is transmitted from the proxy-card payment gateway 102 to the customer.

Once the desired payment mode is identified, the proxy-card payment gateway 102 sends on or more authorization requests to the respective payment gateways 108a-c to authorize the payment. The proxy-card provider that operates the proxy card payment gateway 102 may itself have issued one or more desired payment modes and subsequently, authorizes the payment from the desired payment mode. On successful completion of the payment, the proxy-card payment gateway 102 transmits an authorization code to the POS 112 via the merchant server 104. The POS 112 subsequently receives the authorization code and a cashier provides a hard copy and/or a soft copy of the receipt, including the authorization code, to the customer if necessary. In an embodiment of the present invention, the customer may be required to sign the receipt if, for example, the proxy card is issued as a credit card, or provide a "personal identification number" (PIN) if, for example, the proxy card is issued as a debit card. In another embodiment, the customer adds an e-mail address to the customer payment preferences store 106, and the proxy-card payment gateway 102 transmits an electronic receipt to the e-mail address.

The proxy-card payment gateway 102 records the transactions carried out by the customer in one or more databases (not shown) that allow the customer to set preferences facilitating real time "tagging" of transactions. The customer may tag a transaction by, for example, storing in the database contextual information associated with the transaction, such as a location (e.g., a Geocode™, or GPS information) of the point of the transaction, or a voice message associated with the transaction. The voice message may indicate, for example, that the item associated with the transaction would make a great gift for the birthday of a friend. In one embodiment the tagging information is stored on the device and is correlated with the proxy card payment gateway 102 databases at a later time. When the customer sets these preferences they are provided with the option of later pulling up any transaction data using the tags associated with the transactions. For example, if the customer wishes to review a history of all food related transactions made in the recent past, the customer may use a menu option on a mobile phone to send a simple command such as "HIST-FOOD 30" through SMS/voice message to receive the transaction data for all food related purchases in the last 30 days. The customer may either use the out-of-band communication or the existing communication network 110 to send the appropriate commands for receiving transaction data through the proxy-card payment gateway 102.

III. Process

Figure 3:
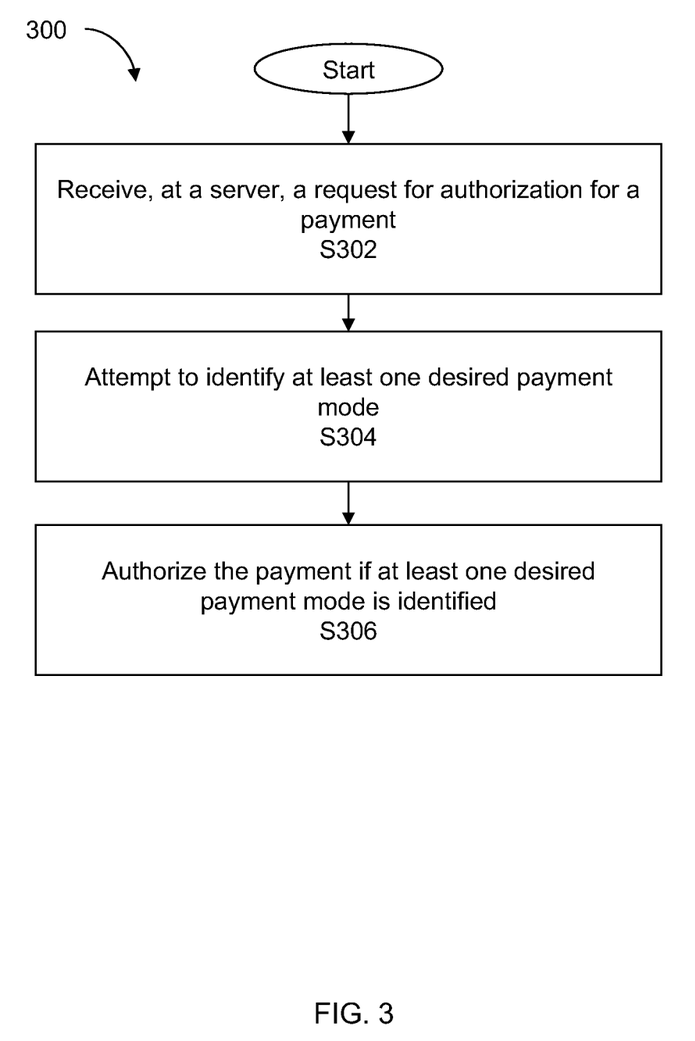
FIG. 3 is a flowchart illustrating one example process for processing payments using proxy cards, according to one embodiment of the present invention.

FIG. 3 is a flowchart illustrating an example process 300 for processing payments using proxy cards, according to an embodiment of the present invention. Preferably, the process 300 may be executed in the environment 100 shown in FIG. 1.

The process 300 begins at step S302, at which the proxy-card payment gateway 102 receives a request for authorization of a payment. In an example embodiment of the present invention, the request for authorization is triggered by swiping of the proxy card of the customer at the POS 112. In an alternate example embodiment, the proxy card may be a radio frequency enabled transaction card, which may be wirelessly detected by a card reader, at the POS 112. In a further example embodiment, the request for authorization may be triggered by entering via a Web interface proxy card details, such as a card identification number (CID). The Web interface may be hosted by an online website capable of making online transactions.

At step S304, the proxy-card payment gateway 102 attempts to identify at least one desired payment mode for making the payment, from among one or more payment modes associated with the proxy card. As explained above, examples of payment mode options include, but are not limited to, a debit card, a credit card, a bank account, a free savings account, a flexible spending account, a health savings account, a pre-paid gift card, a loyalty card, stored-value card, redemption coupons, and the like. The proxy-card payment gateway 102 initially selects at least one payment mode based on one or more selection criteria. For example, in an embodiment of the present invention, the proxy-card payment gateway 102 looks up customer payment preferences store 106 to determine if the customer has configured one or more pre-defined preferences associated with the request for authorization of the payment. A detailed explanation of the pre-defined preferences is described with reference to the FIG. 4.

If no pre-defined customer preferences are associated, then the proxy-card payment gateway 102 communicates the one or more payment mode options to the customer. The customer then selects a preferred payment mode. The proxy-card payment gateway 102 may communicate the payment modes to the customer by sending an out-of-band notification to the customer. In an exemplary case, the out-of-band notification is sent to the mobile phone 116 of the customer. Examples of out-of-band notification include, but are not limited to, notification through an SMS message, a voice call back, an email and the like.

The proxy-card payment gateway 102 may also communicate alternative payment modes to the customer even if the pre-defined preferences are associated with a request for authorization of a payment. For example, the customer may prefer the proxy-card payment gateway 102 to communicate the selected payment modes to the customer for purchases above a threshold amount, even if the pre-defined preferences are associated for the authorization request.

The proxy-card payment gateway 102 may also suggest a preferred payment mode to the customer, based on past behavior of other customers that have made similar authorization requests for payment.

Subsequently, the proxy-card payment gateway 102 sends authorization requests to the respective payment gateways 108a-c, which have issued the selected payment modes, to perform authorization check(s). In an embodiment of the present invention, the proxy-card provider associated with proxy-cart payment gateway 102 may itself have issued one or more selected payment modes. The proxy-card payment gateway 102 and other payment gateways 108a-c perform their respective authorization checks on the selected cards issued by them. The authorization check is performed to identify at least one desired payment mode for making the payment. Further, the authorization check is based at least in part on one or more authorization criteria, which may include checking an available credit limit of the payment mode for making the payment, an expiry date of the payment mode, validity of the payment mode, customer preferences associated with a particular payment mode, and the like.

If the selected payment mode is authorized, then the proxy-card payment gateway 102 sends request to the respective payment gateways 108a-c, which correspond to the selected payment modes, to authorize the payment. As described above, the proxy-card payment gateway 102 may be associated with a proxy-card provider which has issued one or more selected payment modes. At step S306, the proxy-card payment gateway 102 and other payment gateways 108a-c authorize the payment from the selected payment modes. On completion of the payment, the proxy-card payment gateway 102 sends an authorization code back to the POS 112 via the merchant server 104. Preferably proxy-card payment gateway 102 sends a single authorization code back to POS 112.

If the selected payment modes are not authorized, then the proxy-card payment gateway 102 may select at least one alternative payment mode, based on one or more selection criteria. The one or more selection criteria, may include checking whether pre-defined preferences are present for the re-selection criteria, communicating the rest of the payment mode options to the customer for selecting the payment mode based on the customer preference, or by checking a past behavior of the customer or other customers for similar authorization requests, etc.

Figure 4:
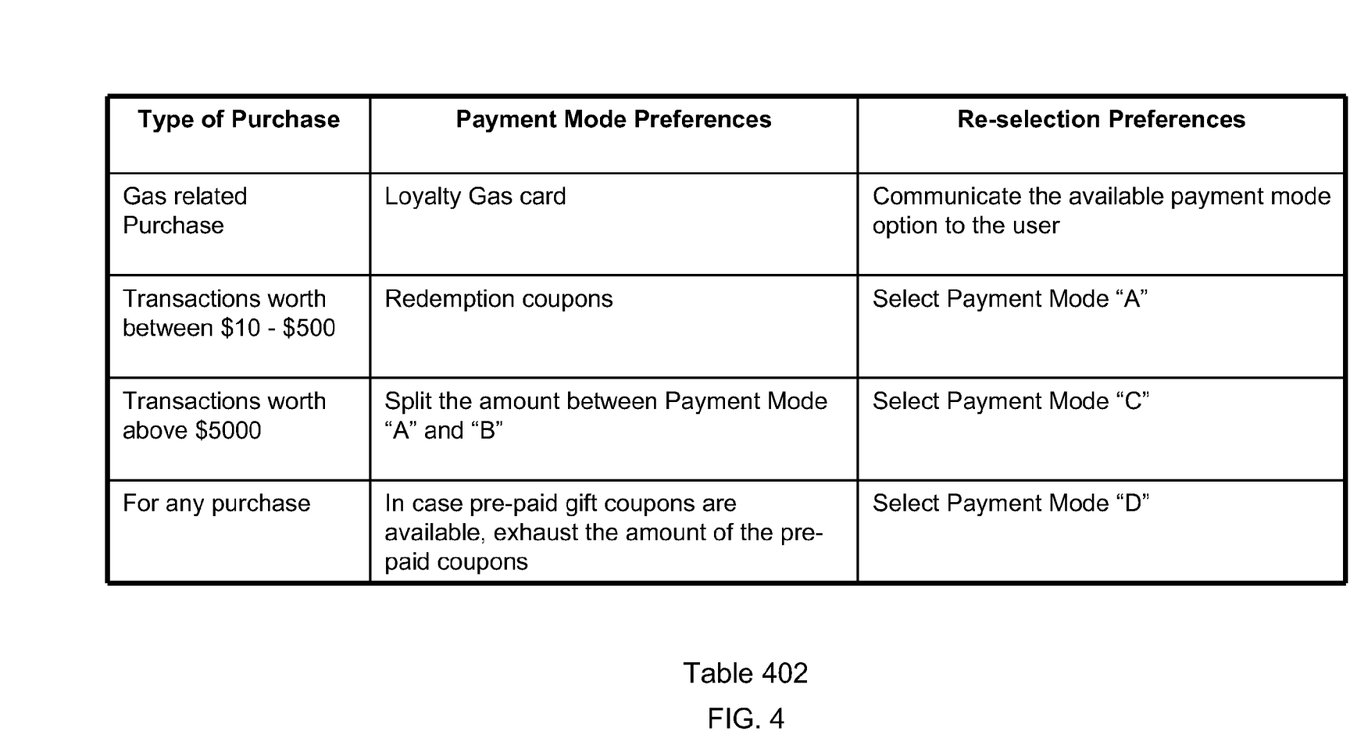
FIG. 4 shows a table representing various pre-defined preferences, according to an exemplary embodiment of the present invention.

FIG. 4 shows a table representing various pre-defined preferences, in accordance with an exemplary embodiment of the present invention. Based on individual requirements, customers may pre-define preferences associated with the request for authorization of payment. Table 402 represents exemplary pre-defined preferences. As shown in the table 402, the customer may pre-define a loyalty gas card to be used for making payments related to gas related transactions. Similarly, loyalty food cards may be used for making payment at restaurants. The customer may also pre-define a particular payment mode option for transactions between pre-defined amounts. For example, as shown in table 402, the customer may pre-define to choose redemption coupons for transactions in a range of $10-$500. Similarly, the customer may predefine to split the transaction amount between two payment modes, for example between payment modes "A" and "B", for transactions worth greater than $5000. In another example implementation, the customer may pre-define to use pre-paid gift card as default payment mode for all transactions until the amount available in the pre-paid card gets exhausted.

The customer may also configure pre-defined preferences for re-selection of payment modes when previously selected payment modes are not accepted. For example, if the selected payment modes fail an authorization check performed by the proxy-card payment gateway 102 a re-selection procedure is performed in accordance with the various pre-defined preferences for re-selection of payment modes shown in table 402. For example, if the loyalty gas card fails an authorization check, then according to the re-selection preferences of the customer, the proxy-card payment gateway 102 communicates the available payment mode options to the customer. In another example, for transactions in a range of $10-$500, if the redemption coupons are exhausted, then according to the re-selection preferences, the proxy-card payment gateway 102 selects payment mode "A" for making the payment. Similarly, for re-selection in case of transactions worth above $5000, the proxy-card payment gateway 102 may select payment mode "C", according to the re-selection preferences associated by the customer. In a further example, if the pre-paid gifts card amount is exhausted, then the proxy-card payment gateway may select payment mode "D", according to the re-selection preferences associated by the customer. Of course, FIG. 4 represents one example and is not meant to be limiting. The table presented is merely for example. Further, the pre-defined preferences can be based on one or more different needs of the customers.

Figure 5:
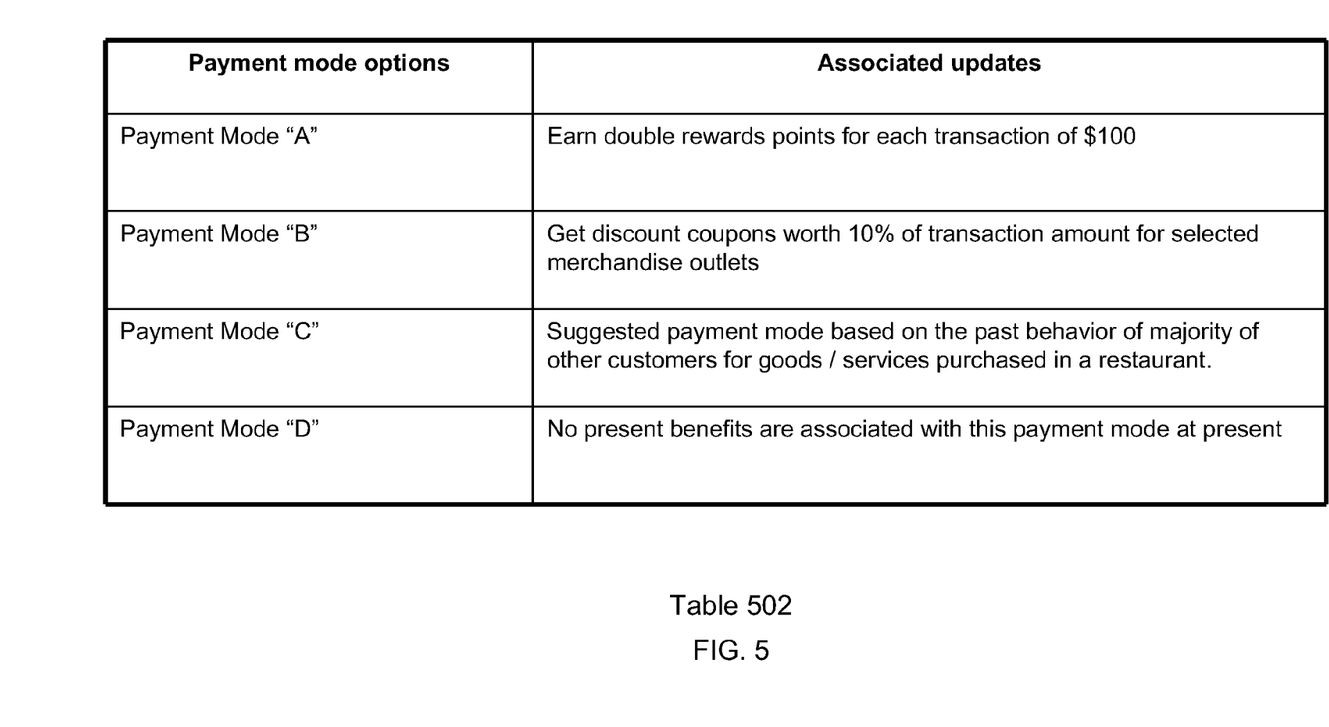
FIG. 5 shows a table representing one or more payment mode options, according to an exemplary embodiment of the present invention.

FIG. 5 shows a table representing one or more payment mode options, in accordance with an exemplary embodiment of the invention. The proxy-card payment gateway 102 may communicate the one or more payment mode options to the customer and request the customer to select a preferred payment mode by sending an out-of-band notification. Examples of out-of-band notification include notification through an SMS message, a voice call back, an email and the like. The proxy-card payment gateway 102 can also communicate the offers to the customer based on a preferred payment mode. The preferred payment mode, in turn, is based on dynamic updates received from one or more of the payment mode providers. Table 502 represents payment mode options available to the customer and exemplary dynamic updates associated with those payment modes. For example, one payment mode option is a payment mode "A". The proxy-card payment gateway 102 communicates the dynamic update associated with the payment mode "A". For example, on using payment mode "A", the customer gets double rewards points for each transaction of $100. Similarly, using payment mode "B" provides the user with discount coupons worth 10% of the transaction amount from participating merchandise outlets. In one embodiment, the customer adds a pre-defined preference to customer payment preferences store 106 setting goals of accumulating a predetermined number of points, amount of cash back, etc. In this case, the payment mode that results in the maximum gain towards one of the goals is selected.

According to another embodiment, the proxy card serves as a proxy for initiating a new payment mode, such as a new credit card, debit card, bank account, pre-paid gift card, health savings account, loyalty rewards account, redemption coupon, etc. The customer selects and/or configures the new payment mode either manually via out-of-band communication with proxy-card payment gateway 102, or automatically according to a pre-defined business rule, a customer preference, etc., stored in customer payment preferences store 106. By enabling the proxy card to serve as a proxy for initiating a new payment mode, the new payment mode can be used by customers at a POS via the proxy card, without the need to extensively modify hardware and/or software of the POS to be compatible with the new payment mode. This decreases time-to-market for implementing new payment modes on POS systems.

In yet another embodiment, a customer uses a temporary card as a proxy card for a misplaced or stolen credit card. For example, the customer reports the misplacement of the credit card to the corresponding issuer. The issuer deactivates the misplaced credit card. The customer purchases a gift card at a local merchant and informs the issuer, via telephone, a website of the issuer, or any other suitable communication means, that the customer has purchased the gift card and wishes to use it as a temporary proxy for the misplaced credit card. In some embodiments, the gift card is issued by the same issuer of the misplaced credit card. The issuer verifies the customer's information and configures the gift card to be a temporary proxy for the misplaced credit card. The customer uses the gift card as a temporary proxy to the misplaced credit card until the customer receives a replacement credit card from the issuer. In some embodiments, the proxy gift card's use is subject to a predetermined time period, a predetermined number of transactions, a predetermined amount of credit, etc. Upon receiving the replacement credit card, the customer activates it and the proxy gift card becomes deactivated. Rapid card fulfillment is achieved by enabling the customer to use a temporary card that is readily accessible as a proxy to a misplaced card.

In another aspect, as an alternative to using a gift card as a proxy, a customer uses another credit card as a proxy to a lost credit card. In some embodiments the proxy is another credit card that was issued to the customer by the same issuer of the misplaced credit card. In addition, the customer can use a single credit card as a proxy to multiple lost credit cards, or multiple credit cards as proxies to a single lost credit card.

The proxy-card payment gateway 102 also can suggest a preferred payment mode to the customer based at least in part on "past behavior" of the customer and/or majority of other customers who generated similar authorization requests. For example, the proxy-card payment gateway can suggest payment mode "C" for goods/services purchased in a restaurant based on the recorded past behavior of the customer and/or majority of other customers.

Figure 6A:
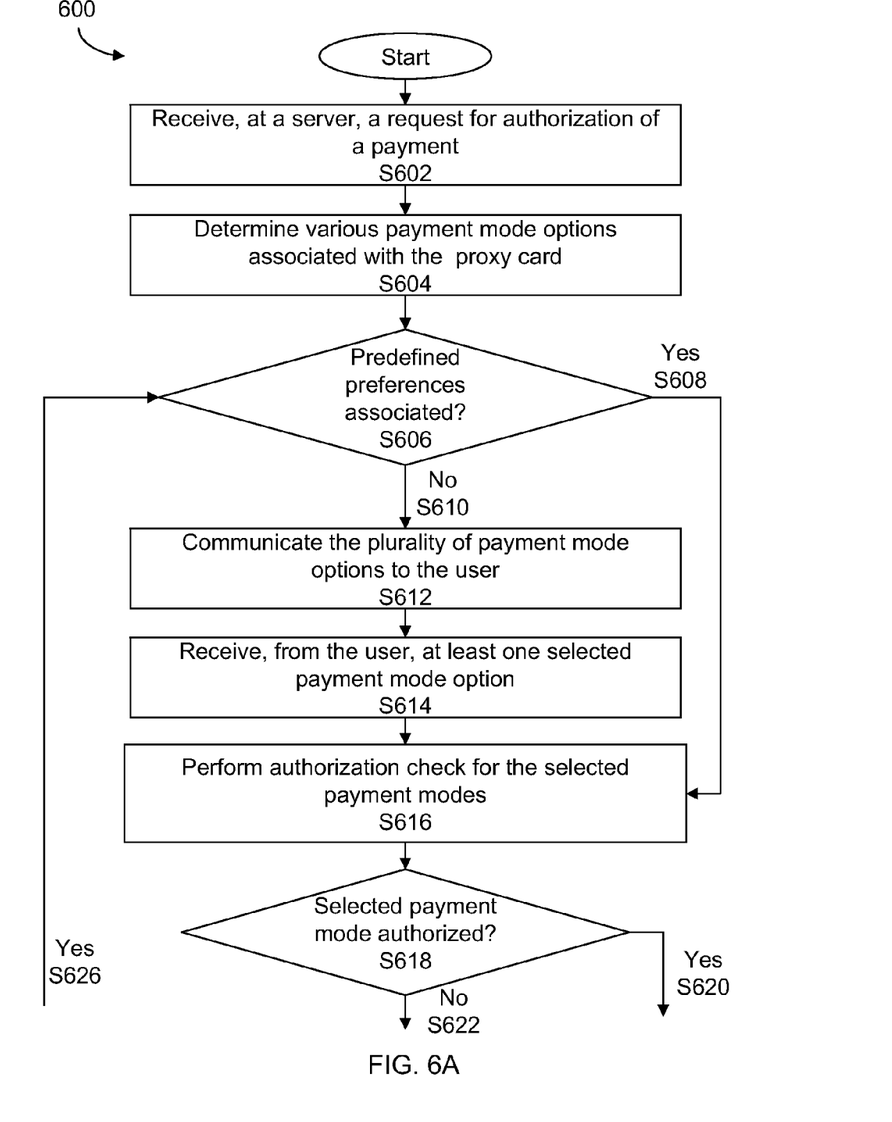
FIGS. 6A and 6B show a flowchart illustrating one example process for processing payments using proxy cards, according to another embodiment of the present invention.
Figure 6B:
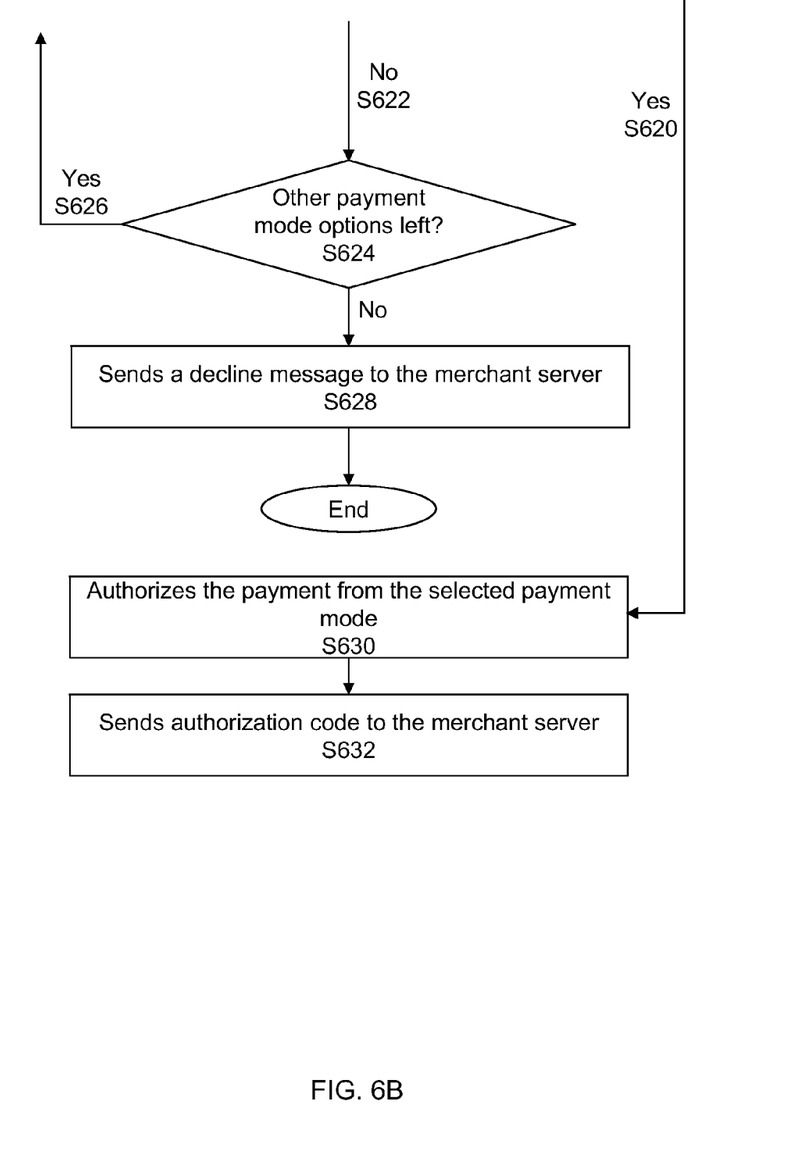

FIGS. 6A and 6B show a flowchart illustrating one example process 600 for processing of payments for proxy cards, according to another embodiment of the present invention. Preferably, the process 600 may be executed in environment 100 described above in connection with FIG. 1.

The process begins at step S602, at which the proxy-card payment gateway 102 receives a request for authorization of a payment. In one example embodiment of the present invention, the authorization request is initiated via the merchant server 104 by the swiping of the proxy card of the customer at the POS 112.

At step S604, since the request is initiated by the proxy card, the proxy-card payment gateway 102 determines the one or more payment mode options associated with the proxy card of the customer.

At step S606, in order to select at least one payment mode, the proxy-card payment gateway 102 looks up the customer payment preferences store 106 to identify if the customer has configured any pre-defined preferences for the authorization request. For example, the customer may have specified a particular card, such as a loyalty gas card, for all transactions related to payment for gas purchases. In another example, the customer might have provided a preference to exhaust the balance in a pre-paid gift card for any purchase below a certain amount. If there are pre-defined preferences associated with the payment mode for the authorization request, then at step S608, the proxy-card payment gateway 102 further processes the authorization request. However, if there are no pre-defined preferences associated, then at step 610 the proxy-card payment gateway 102, adopts an alternative way for selecting at least one payment mode.

At step S612, the proxy-card payment gateway 102 communicates the one or more payment mode options to the customer, seeking authorization from the customer to select at least one payment mode. In an embodiment of the present invention, the proxy-card payment gateway 102 uses an out-of-band communication to inform the customer about one or more payment mode options.

At step S614, the proxy-card payment gateway 102 receives at least one selected payment mode from the customer as per their preferences.

Since the proxy-card payment gateway 102 selected at least one payment mode from either step S606 or step S614, the proxy-card payment gateway 102 sends request to the respective payment gateways 108a-c, which have issued the selected payment modes, to perform their respective authorization checks. In an embodiment of the present invention, the provider associated with proxy-card payment gateway 102 may itself have issued one or more selected payment modes. Subsequently, at step S616 the proxy-card payment gateway 102, and other payment gateways 108a-c perform a corresponding authorization check on the selected cards issued by them. Each authorization check is based at least in part on one or more authorization criteria, which includes, but may not be limited to, checking credit limit of the selected payment mode, checking expiry date of the payment mode, checking validity of the payment mode, checking any other customer preferences that may be associated with the payment modes or alike.

At step S618, the proxy-card payment gateway 102 checks if the selected payment mode has been authorized. If the selected payment mode has been authorized, then at step S620, the proxy-card payment gateway 102 proceeds to process the request for authorization of the payment. However, if the selected payment modes are not authorized, then at step S622, the proxy-card payment gateway 102 proceeds to select at least one alternative payment mode.

At step S624, the proxy-card payment gateway 102 checks if any other payment mode options are left. If other payment mode options are left, then at step S626, the proxy-card payment gateway 102 proceeds to select at least one alternative payment mode for the payment. To select an alternative payment mode, the proxy-card payment gateway 102 moves back to step S606. However, in case no other payment mode options are left, then the proxy-card payment gateway 102 declines the authorization request for the payment and at step S628, the proxy-card payment gateway 102 sends a decline message to the POS 112 via the merchant server 104. In one embodiment, the decline message is presented to the customer via the POS 112.

However, in case the selected payment mode gets authorized, then the proxy-card payment gateway 102 sends request to the respective payment gateways 108a-c, which have issued the selected payment modes, to authorize the payment. In an embodiment of the present invention, the proxy-card payment gateway 102 may itself has issued one or more selected payment modes. Subsequently, at step S630, the proxy-card payment gateway 102 and other payment gateways 108a-c authorize the payment from the selected payment modes issued by them.

At step S632, on completion of the payment, the proxy-card payment gateway 102 sends an authorization code to the POS 112 via the merchant server 104. In one embodiment, an authorization message is presented to the customer via the POS 112.

IV. Example Implementations

The present invention (i.e., system 100, system 200, process 300, process 600, or any part(s) or function(s) thereof) may be implemented using hardware, software or a combination thereof, and may be implemented in one or more computer systems or other processing systems. However, the manipulations performed by the present invention were often referred to in terms, such as comparing or checking, which are commonly associated with mental operations performed by a human operator. No such capability of a human operator is necessary, or desirable in most cases, in any of the operations described herein, which form a part of the present invention. Rather, the operations are machine operations. Useful machines for performing the operations in the present invention may include general-purpose digital computers or similar devices.

Figure 7:
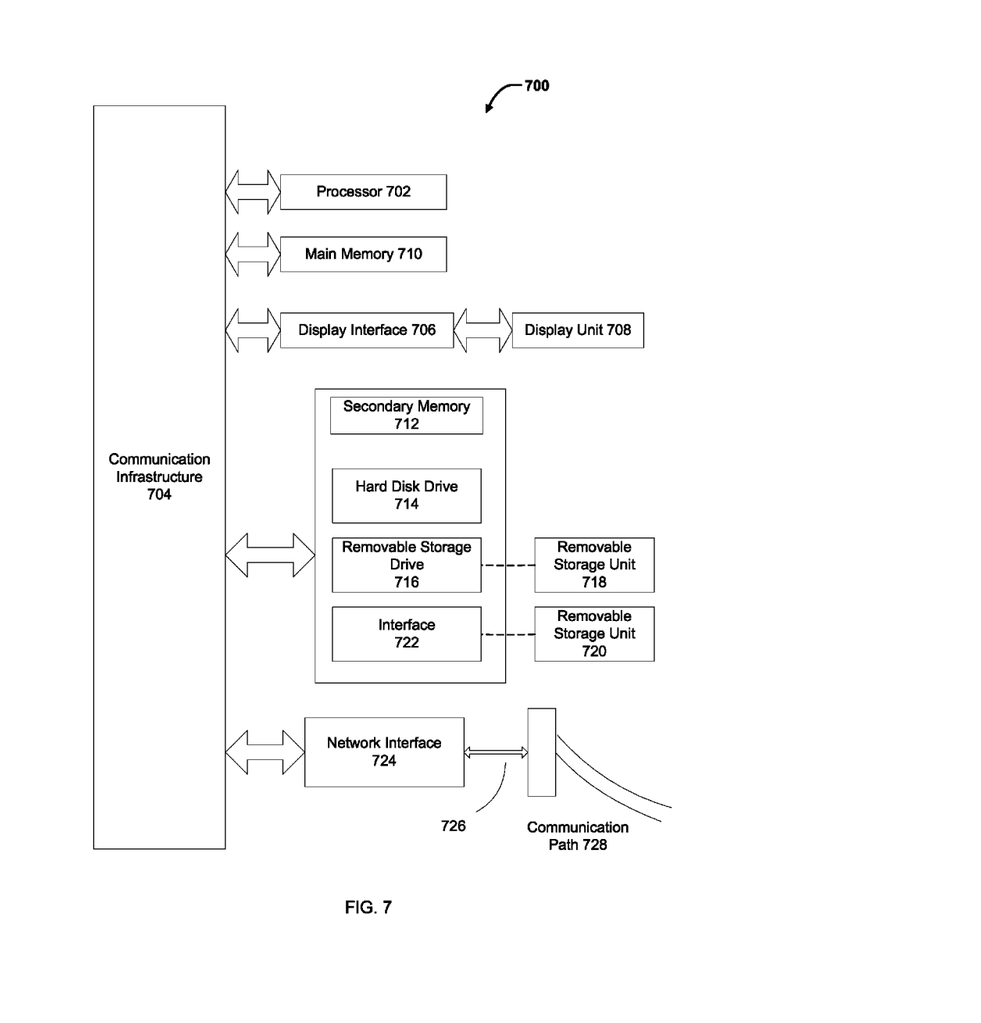
FIG. 7 is a block diagram of one example computer system useful for implementing the present invention, according to one embodiment of the present invention.

In fact, in accordance with an embodiment of the present invention, the present invention is directed towards one or more computer systems capable of carrying out the functionality described herein. An example of the computer systems includes a computer system 700, which is shown in FIG. 7.

The computer system 700 includes at least one processor, such as a processor 702. Processor 702 is connected to a communication infrastructure 704, for example, a communications bus, a cross over bar, a network, and the like. Various software embodiments are described in terms of this exemplary computer system 700. After reading this description, it will become apparent to a person skilled in the relevant art(s) how to implement the present invention using other computer systems and/or architectures.

The computer system 700 includes a display interface 706 that forwards graphics, text, and other data from the communication infrastructure 704 (or from a frame buffer which is not shown in FIG. 7) for display on a display unit 708.

The computer system 700 further includes a main memory 710, such as random access memory (RAM), and may also include a secondary memory 712. The secondary memory 712 may further include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a well known manner. The removable storage unit 718 may represent a floppy disk, magnetic tape or an optical disk, and may be read by and written on by the removable storage drive 716. As will be appreciated, the removable storage unit 718 includes a computer usable storage medium having stored therein, computer software and/or data.

In accordance with various embodiments of the present invention, the secondary memory 712 may include other similar devices for allowing computer programs or other instructions to be loaded into the computer system 700. Such devices may include, for example, a removable storage unit 720, and an interface 722. Examples of such devices may include a program cartridge and cartridge interface (such as that found in video game devices), a removable memory chip (such as an erasable programmable read only memory (EPROM), or programmable read only memory (PROM)) and associated socket, and other removable storage units 720 and interfaces 722, which allow software and data to be transferred from the removable storage unit 720 to the computer system 700.

The computer system 700 may further include a communication interface 724. The communication interface 724 allows software and data to be transferred between the computer system 700 and external devices. Examples of the communication interface 724 include, but may not be limited to a modem, a network interface (such as an Ethernet card), a communications port, a Personal Computer Memory Card International Association (PCMCIA) slot and card, and the like. Software and data transferred via the communication interface 724 are in the form of a plurality of signals, hereinafter referred to as signals 726, which may be electronic, electromagnetic, optical or other signals capable of being received by the communication interface 724. The signals 726 are provided to the communication interface 724 via a communication path (e.g., channel) 728. The communication path 728 carries the signals 726 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 716, a hard disk installed in hard disk drive 714, the signals 726, and the like. These computer program products provide software to the computer system 700. The present invention is directed to such computer program products.

Computer programs (also referred to as computer control logic) are stored in the main memory 710 and/or the secondary memory 712. Computer programs may also be received via the communication interface 704. Such computer programs, when executed, enable the computer system 700 to perform the features of the present invention, as discussed herein. In particular, the computer programs, when executed, enable the processor 702 to perform the features of the present invention. Accordingly, such computer programs represent controllers of the computer system 700.

In accordance with an embodiment of the present invention, where the present invention is implemented using a software, the software may be stored in a computer program product and loaded into the computer system 700 using the removable storage drive 716, the hard disk drive 714 or the communication interface 724. The control logic (software), when executed by the processor 702, causes the processor 702 to perform the functions of the present invention as described herein.

In another embodiment, the present invention is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present invention is implemented using a combination of both the hardware and the software.

V. Conclusion

The various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
    receiving, by a computer system, a transaction request that identifies a proxy transaction account number, wherein the proxy transaction account number is associated with a plurality of transaction accounts associated with a customer;
    selecting, by the computer system, at least one transaction account from the plurality of transaction accounts;
    authorizing, by the computer system, the transaction request; and
    in response to authorizing the transaction request, the computer system charging the at least one transaction account;
    wherein the selecting includes:
        identifying the plurality of transaction accounts based at least in part on the proxy transaction account number;
        retrieving behavior data corresponding to a plurality of previous transactions, including previous transactions by a plurality of other customers;
        performing one or more comparisons of one or more transaction details of the transaction request to one or more previous transaction details of one or more of the previous transactions by the plurality of the other customers; and
        based at least in part on the one or more comparisons, determining that at least one particular transaction of the one or more of the previous transactions by the plurality of the other customers has a similarity to the transaction request, wherein selecting the at least one transaction account is based on a particular transaction account used by another customer for the at least one particular transaction.

2. The method of claim 1, wherein selecting the at least one transaction account comprises:
    identifying, by the computer system, transaction account selection criteria associated with the proxy transaction account number; and
    selecting, by the computer system, the at least one transaction account based at least in part on the transaction account selection criteria.

3. The method of claim 1, wherein selecting the at least one transaction account comprises:
    sending, by the computer system to the customer, a payment account identification request; and
    receiving, by the computer system from the customer in response to the payment account identification request, a selection of the at least one transaction account.

4. The method of claim 3, wherein the payment account identification request includes a suggestion of a particular transaction account of the plurality of transaction accounts.

5. The method of claim 2, wherein the transaction account selection criteria includes one or more pre-defined preferences received from the customer.

6. The method of claim 2, further comprising determining, by the computer system, a particular good or service associated with the transaction request, wherein the transaction account selection criteria indicates that the at least one transaction account should be selected for transaction requests that include the particular good or service.

7. The method of claim 5, wherein the one or more pre-defined preferences indicate a default transaction account, and wherein selecting the at least one transaction account comprises determining, by the computer system, whether the transaction request is authorized for the default transaction account.

8. The method of claim 5, wherein the one or more pre-defined preferences indicate a first default transaction account for a first transaction amount and the one or more pre-defined preferences indicate a second default transaction account for a second transaction amount, and wherein selecting the at least one transaction account comprises determining, by the computer system, a transaction amount indicated by the transaction request.

9. The method of claim 1, wherein the plurality of transaction accounts include a debit account, a credit account, a charge account, a bank account, a free savings account, a flexible spending account, a health savings account, a gift card account, a stored-value card account, or a reward points account, or any combination thereof.

10. The method of claim 1, wherein selecting the at least one transaction account comprises:

selecting, by the computer system, a different transaction account from the plurality of transaction accounts;

determining, by the computer system, that the transaction request is not authorized for the different transaction account; and selecting, by the computer system, the at least one transaction account.

11. The method of claim 1, wherein authorizing the transaction request comprises sending, by the computer system to the customer, one or more authentication requests associated with the at least one transaction account.

12. The method of claim 1, wherein the selecting comprises determining that a majority of the plurality of the other customers used a particular payment method in the previous transactions by the plurality of the other customers; and
wherein the selected at least one transaction account corresponds to the particular payment method.

13. A system comprising:
a processor; and
a non-transitory memory having instructions stored thereon that, in response to execution by the processor, cause the system to perform operations comprising:
receiving a transaction request that includes a proxy transaction account number, wherein the proxy transaction account number is associated with a plurality of transaction accounts associated with a customer;
selecting, in response to receiving the proxy transaction account number, at least one transaction account from the plurality of transaction accounts; and
determining, based at least in part on the selected at least one transaction account, whether to authorize the transaction request;
wherein the selecting includes:
identifying the plurality of transaction accounts based at least in part on the proxy transaction account number;
identifying one or more other customers, wherein at least a portion of payment preferences of the one or more other customers are similar to one or more defined payment preferences of the customer;
retrieving at least some of the payment preferences of the one or more other customers; and
determining the at least one transaction account based at least in part on at least one of the payment preferences of the one or more other customers.

14. The system of claim 13, wherein the operations further comprise rejecting the transaction request in response to transaction data associated with the transaction request failing to meet one or more respective requirements associated with each of the plurality of transaction accounts.

15. The system of claim 14, wherein the transaction data associated with the transaction request is a transaction amount, and wherein the one or more respective requirements is a respective credit limit.

16. The system of claim 13, wherein determining whether to authorize the transaction request comprises comparing transaction data from the transaction request to a credit limit of the at least one transaction account, to an expiration date of the at least one transaction account, to one or more customer preferences associated with the at least one transaction account, or any combination thereof.

17. An article of manufacture including a non-transitory computer readable medium having instructions stored thereon that, in response to execution by a computer system, cause the computer system to perform operations comprising:
sending, to a customer, a proxy transaction account number associated with a plurality of transaction accounts of the customer;
receiving, from a merchant, a transaction request that identifies the proxy transaction account number;
selecting, based at least in part on receiving the proxy transaction account number, at least one transaction account from the plurality of transaction accounts;
authorizing the transaction request based at least in part on the at least one transaction account; and
sending, to the merchant, an indication that the transaction request is authorized;
wherein the selecting includes:
identifying the plurality of transaction accounts based at least in part on the proxy transaction account number;
retrieving behavior data corresponding to a plurality of previous transactions, including previous transactions by a plurality of other customers;
performing one or more comparisons of one or more transaction details of the transaction request to one or more previous transaction details of one or more of the previous transactions by the plurality of other customers; and
based at least in part on the one or more comparisons, determining that at least one particular transaction of the one or more of the previous transactions by the plurality of the other customers has a similarity to the transaction request, wherein selecting the at least one transaction account is based on a payment method used by another customer for the at least one particular transaction.

18. The article of manufacture of claim 17, wherein the operations further comprise, after authorizing the transaction request, initiating charging the at least one transaction account based at least in part on the transaction request.

19. The article of manufacture of claim 17, wherein the operations further comprise:
receiving, from the customer after authorizing the transaction request, a request to charge a different transaction account of the plurality of transaction accounts; and
initiating charging the different transaction account based at least in part on the transaction request.

20. The article of manufacture of claim 17, wherein the operations further comprise:
receiving, from a second merchant, a second transaction request that identifies the proxy transaction account number;
selecting, based at least in part on receiving the proxy transaction account number, a different transaction account from the plurality of transaction accounts, wherein the different transaction account is not included in the at least one transaction account;
authorizing the second transaction request in response to identifying the different transaction account; and
sending, to the second merchant, a second indication that the second transaction request is authorized.

* * * * *